Patented Aug. 21, 1951

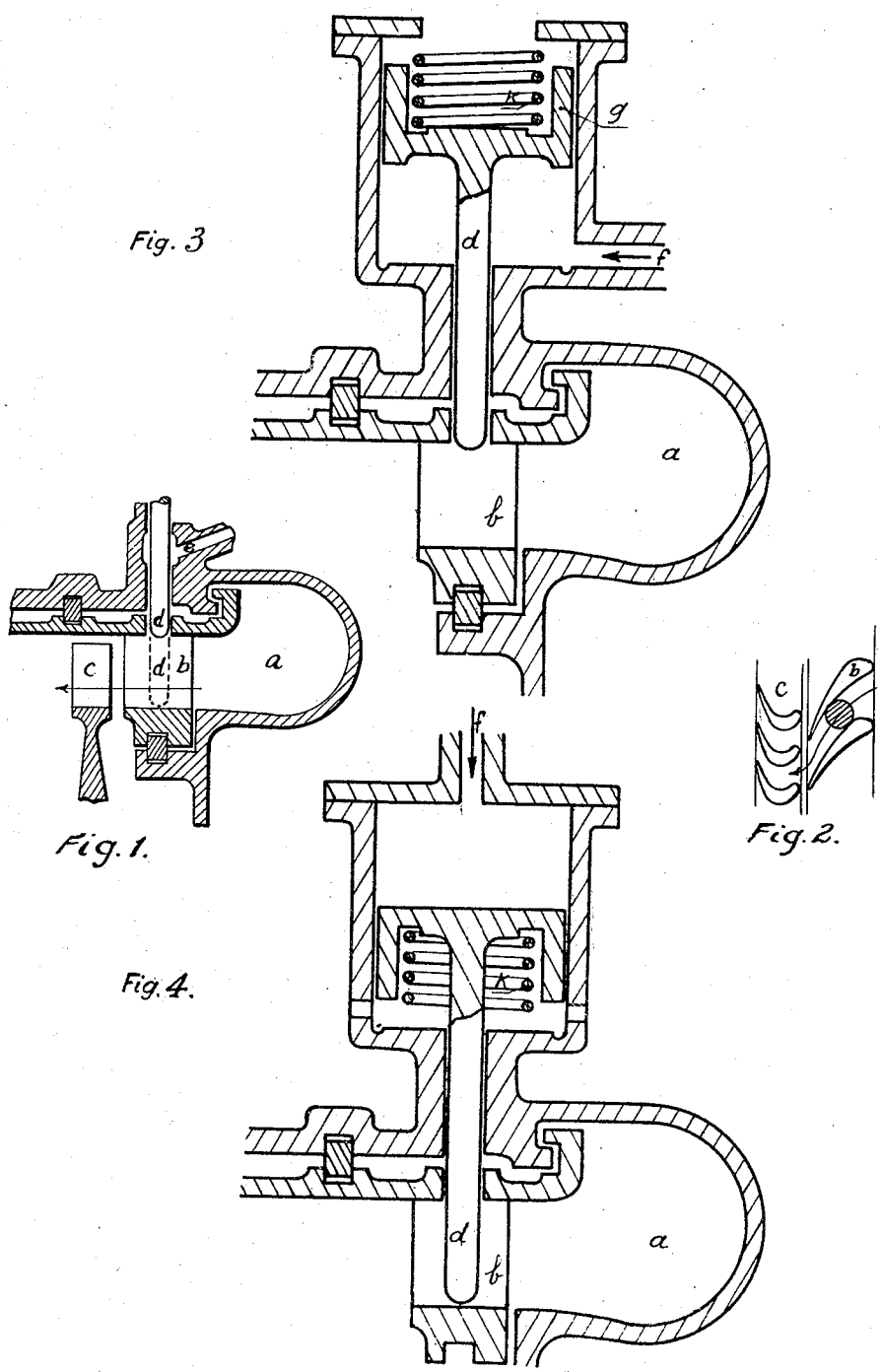

2,565,178

UNITED STATES PATENT OFFICE 2,565,178

GAS TURBINE

Roger Jean Imbert, Paris, France, assignor to Société Rateau (Société Anonyme), Paris, France, a company of France, and René Anxionnaz, Paris, France, jointly Application June 11, 1945, Serial No. 598,764
In France October 13, 1942

Section 1, Public Law 690, August 8, 1946
Patent expires October 13, 1962

2 Claims. (Cl. 253—78)

The high temperatures of the driving fluid in gas turbines make it very difficult to adjust the expansion ports through any known means, either when it is desired to obtain the best adaptation of the compressor or compressors considered to all rates of running or for suitably modifying the fluid fluxes driving the auxiliary turbines controlling the compressors and the driving turbines proper or for any other adjusting requirements.

The present invention has for its object a device allowing such an adjustment. It comprises for closing one or more of the channels or nozzles used for injecting hot gases or of the distributors inserted between two successive expansion stages, cylinders adapted to slide perpendicularly to the axis of the opening so as to be placed between the bladings, at the neck of the nozzle upwards with reference to said neck. This improved arrangement, while avoiding all losses through lamination or throttling which would be detrimental for the efficiency of the engine system, is of particular interest for gas turbines as it allows all the elements of the stator a free expansion.

The following description and accompanying drawings relate to particular forms of execution of the invention given out by way of examples but by no means in a limitative sense and they will allow the execution of the invention to be easily understood, the particular features appearing either in the drawing or in the specification forming of course part of said invention.

Figs. 1 and 2 are diagrammatical views of the closing means.

Figs. 3 and 4 illustrate an automatic control for said device.

Fig. 1 is a longitudinal cross section through the nozzle section of a gas turbine while Fig. 2 is a developed cross section of this same nozzle section through a cylinder coaxial with the turbine; the arrows illustrate the path of the hot gases; $a$ designates the torus-shaped pipe admitting the gases into the turbine; $b$ the expansion nozzle, $c$ the blade carrying wheel of the turbine and $d$ the obturating or closing cylinder designed in accordance with the invention.

In Fig. 1, the cylinder is shown in full lines in its opening position and in interrupted lines in its closing position.

The displacement of the closing cylinder $d$ may be controlled either by hand through a screw arrangement for instance, or else by an auxiliary motor. The control by hand or through a relay may be common to several cylinders or be limited to one; the individual control of each cylinder allows of course a gradual adjustment of the cross-sectional areas open to the gases together with a more accurate and better adaptation to the individual cylinders.

If the fluid used for actuating the auxiliary motor is not compressed air, it is possible to provide in the guiding means for the shutter or closing cylinder or for its control rod an intermediary chamber $e$ into which is fed air removed from the delivery end of the compressor or from a suitable stage of the latter, so as to solve more easily the problem of fluid tightness at the outlet passage of the control rod. As a matter of fact, if said air is at a suitable pressure, it prevents any leakage of hot gases.

A modification in the control means which is of particular interest is illustrated in Fig. 3; the driving fluid of the auxiliary motor controlling the displacement of the closing or obturating cylinder $d$ is air removed from the delivery end of the compressor of the turbine either at the end of the compression stage or at an intermediary stage. This air is admitted through the channel $f$ so as to act on the piston $g$ controlling the closing or obturating cylinder; a spring $k$ holds the obturating cylinder $d$ in its closing position as long as the pressure of the driving air has not reached that corresponding to the speed of the driving engine, which requires the opening of the shutter. Of course the conditions required for this opening of the obturating cylinder will determine the choice and the characteristic features of the spring $k$.

According to the case, the control of the obturating cylinder may be reversed if it is desired to hold the corresponding channels of the turbine open at low speeds of running. Fig. 4 illustrates this modification: the compressed air arriving at $f$ provides for the closing of the shutter against the action of the spring $k$.

Of course, the control means for the obturating cylinder or cylinders may include relays and be executed in a known manner so that, at the moment at which the reversing pressure is reached, the obturating cylinder may assume either of its extreme opening or closing positions without remaining at an intermediary position.

Obviously, the forms of execution described have been given out solely by way of non limitative examples and it is possible to modify them, chiefly by substituting equivalent means for certain parts, without widening thereby the scope of the invention as defined in accompanying claims.

What I claim is:

1. In a gas turbine of the axial type comprising a stationary casing, a wheel rotatably mounted in said casing and provided with motive blades, and a set of stationary blades located in said casing in ring formation ahead of the blades of said wheel so that the direction of progress of the motive gases through the stationary blades and the motive blades is substantially axial, a guide radially disposed in said casing the inner shape of said guide being substantially cylindrical with a cross-section substantially tangent to the opposite walls of two adjacent stationary blades, a cylindrical member having a cross-section corresponding to that of said guide and slidably mounted therein for controlling by its radial slide the free cross-section between the said two adjacent stationary blades, a cylindrical chamber coaxial to said guide and arranged externally to said casing, a piston disposed in said chamber at the end of said cylindrical member and means for feeding said chamber with a fluid under pressure for operating said cylindrical member.

2. In a gas turbine of the axial-flow type comprising a stationary casing, a wheel rotatably mounted in said casing and provided with motive blades, and a set of stationary blades located in said casing in ring formation ahead of the blades of said wheel so that the direction of progress of the motive gases through the stationary blades and the motive blades is substantially axial, a cylindrical guide radially disposed in said casing the cylindrical inner surface of said guide being smooth and tangent to the opposite walls of two adjacent stationary blades, and a cylindrical member slidably mounted in said guide for controlling by its radial sliding displacement the free cross-section between the said two adjacent stationary blades, said cylindrical member having its control operating head portion smooth, the diameter of said smooth head portion being equal to the gap between said blades so that said head portion slides tangentially to each of said blades.

ROGER JEAN IMBERT.

REFERENCES CITED

The following references are of record in the file of this patent:

UNITED STATES PATENTS

| Number | Name | Date |
|---|---|---|
| 811,983 | Wilkinson | Feb. 6, 1906 |
| 837,934 | Kerr | Dec. 11, 1906 |
| 1,304,412 | Toyokawa | May 20, 1919 |
| 2,072,656 | Trumpler et al. | Mar. 2, 1937 |
| 2,129,691 | Holzwarth | Sept. 13, 1938 |
| 2,280,765 | Imbert | Apr. 21, 1942 |
| 2,389,040 | Gottlieb | Nov. 13, 1945 |

FOREIGN PATENTS

| Number | Country | Date |
|---|---|---|
| 17,783 | Great Britain | 1906 |
| 277,090 | Great Britain | Sept. 8, 1927 |
| 550,574 | Germany | May 12, 1932 |